United States Patent
Kinder et al.

(10) Patent No.: US 7,308,701 B1
(45) Date of Patent: Dec. 11, 2007

(54) WEB SITE LOAD MANAGEMENT

(75) Inventors: David B. Kinder, Portland, OR (US); Stanley Mo, Portland, OR (US); Linda B. Welsh, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/575,076

(22) Filed: May 19, 2000

(51) Int. Cl.
*H04N 7/173* (2006.01)

(52) U.S. Cl. .................. 725/112; 725/109; 725/113; 709/224; 709/226; 709/229

(58) Field of Classification Search ........ 709/217–219, 709/224, 226, 203, 223, 229; 345/718; 725/109, 725/112, 114, 117, 118, 144, 147, 148, 113, 725/116; 348/473, 478
See application file for complete search history.

(56) References Cited

U.S. PATENT DOCUMENTS

| | | | | |
|---|---|---|---|---|
| 5,774,664 A | * | 6/1998 | Hidary et al. ............... | 725/110 |
| 6,326,982 B1 | * | 12/2001 | Wu et al. ..................... | 345/718 |
| 6,330,719 B1 | * | 12/2001 | Zigmond et al. ........... | 725/121 |
| 6,510,556 B1 | * | 1/2003 | Kusaba et al. ............... | 725/93 |
| 6,728,753 B1 | * | 4/2004 | Parasnis et al. ............. | 709/203 |

OTHER PUBLICATIONS

David B. Kinder, Linda B. Welsh and Stanley Mo, U.S. Appl. No. 09/574,851, filed May 19, 2000, entitled "Automatically Delaying Client Responses to Broadcast Uniform Resource Locators".
David B. Kinder, Linda B. Welsh and Stanley Mo, U.S. Appl. No. 09/574,849, filed May 19, 2000, entitled "Automatically Delaying Client Responses to Broadcast Uniform Resource Locators".

* cited by examiner

*Primary Examiner*—Ngoc Vu
(74) *Attorney, Agent, or Firm*—Trop, Pruner & Hu, P.C.

(57) ABSTRACT

A system for broadcasting enhanced television content may provide for early notification of web hosting facilities when uniform resource locators may be broadcast with television content. When uniform resource locators are broadcast with television content, a large number of users may attempt to simultaneously access the hosting web site for the uniform resource locator. By providing early warning through the television broadcast system, the web servers which handle the load of attempted web accesses may gear up for the load spike. Through an automatic system, a relatively failsafe procedure may be implemented to ensure that the web hosting facilities receive notice sufficient to enable them to prepare for the onslaught of attempted accesses.

23 Claims, 3 Drawing Sheets

WEB SITE LOAD MANAGEMENT

BACKGROUND

This invention relates generally to Internet web servers.

Internet web servers post web pages that form web sites for various business and other entities. In a number of circumstances, these web sites may experience excessive loads. In fact, the number of attempted accesses may become so high that the web server hosting the web site may fail. As a result, users may become frustrated with the web site's performance. In cases of commercial web sites, this may result in lost sales and decreased customer satisfaction.

Often there is a disconnection between the business that owns the web site and the web site server. For example, it is conventional that a business may establish a web site at a web hosting facility. The web hosting facility may have no way to know anything about the business activities of the company whose web page it hosts.

As a result, the company may place advertisements or other broadcast information, including its uniform resource locator (URL), to facilitate access to its web page without notifying the web hosting facility. In some cases, the resulting web page access load may be so excessive that the web server may fail.

As an example of circumstances wherein a web server failure may occur, a URL may be provided in a widely broadcast television advertisement. A large number of viewers, seeing the advertisement at the same time, may attempt to simultaneously access the web site. If the number of attempted accesses is excessive, the web server may fail, making it impossible for a large number of potential customers to access the desired information. This obviously results in lost business opportunity and wasted expense for television advertising that does nothing but frustrate potential customers and decrease goodwill.

The problem may be even more acute in systems which broadcast television programming together with enhanced content or ancillary data. In these systems, URLs may be broadcast with the television programming. For example, users may receive these broadcasts on set-top boxes that enable them to mouse click on the information provided with the programming to immediately access the associated web site. Thus, it is particularly easy for set-top box users to quickly access associated web pages broadcast with television programming. As a result, the possibility of web site server failure is increased because many viewers receive the television content together with the ancillary data at the same time. As a result, they may all attempt to access the associated web site at the same time. This may result in prolonged server failure with extended downtime.

Thus, there is a need for better ways to manage attempted web accesses in periods of high interest.

DETAILED DESCRIPTION

Figure 1:
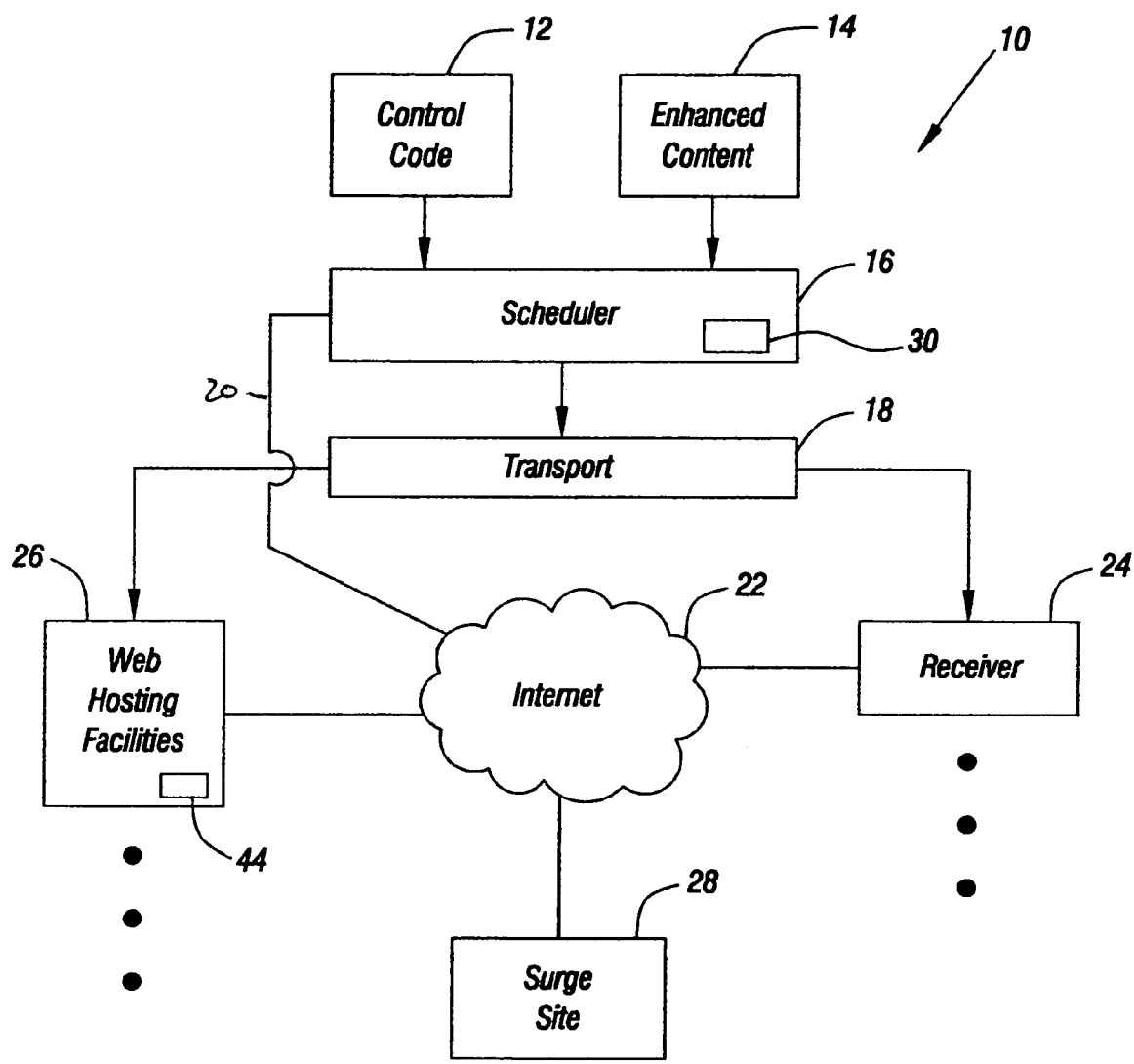
FIG. 1 is a schematic depiction of one embodiment of the present invention.

A web server management system 10, shown in FIG. 1, includes a scheduler 16 which schedules the transmission of television programming and associated enhancements such as ancillary information. The scheduler 16 may be in accordance with the Advanced Television Enhancement Forum (ATVEF) Specification, Version 1.1r.26 (Feb. 2, 1999) for example. Television programming may be transmitted together with ancillary data such as uniform resource locators (URLs). The programming and related ancillary data may be programmed for transmission at the same time using the so-called transport A protocol. Alternatively, the ancillary data may be transmitted at different times from the programming information for eventual re-linking with the programming information, under the transport B protocol.

The scheduler 16 controls the schedule of transmission of ancillary data 14 received from content providers. The scheduler 16 transports the content 14 over a transport 18 to a plurality of receivers 24.

The receivers 24 may be television receivers or systems with information handling capability which may be known as processor-based systems. These processor-based systems may provide Internet access in addition to simply receiving television programming. One such receiver is the so-called set-top box that uses a television receiver as the display and implements conventional desktop computer functionality including Internet access. Thus, a plurality of receivers, such as the receiver 24, may be coupled to both the transport 18 and the Internet 22.

The transport 18 may also communicate the same programming information and ancillary data to a web hosting facility 26. Thus, the web hosting facility 26 may receive the television programming information. This information may be of use to the web hosting facility as a last warning that ancillary data, including a URL, has been broadcast to a large number of receivers. This may also warn the facility 26 that a large number of attempted accesses to a URL, hosted by the facility 26, may be imminent.

The scheduler 16 may also develop control code 12. The control code 12 provides information about URLs that will be broadcast as ancillary data with programming. Thus, the control code 12 may include information about the URL, the channel on which it is being broadcast, the time or times when it is broadcast and the geographical area to which it is being broadcast. This information may be included within an announcement stream in a digital broadcast as additional ancillary data. The control code 12 may also be included in the vertical blanking interval (VBI) or closed caption stream in connection with a conventional analog broadcast.

The control code 12 may be sent out for parsing by the web hosting facility 26 that may receive it through the transport medium 18. The facility 26 may also receive the same warning earlier, directly from the scheduler 16. That is, at the time the scheduler 16 sets the schedule for transmitting the ancillary data 14, the scheduler 16 may provide an early warning to the web hosting facility 26 of the intended schedule of the planned URL announcement. This scheduling information may, for example, be transmitted over the Internet 22 through a back channel 20 from the scheduler 16 to web hosting facility 26 over the Internet 22.

Knowing when the potential load spike may occur, the web hosting facility 26 may schedule extra hosting capacity. For example, the web hosting facility 26 may schedule a surge site 28 to handle a particular URL. That is, a very high capacity surge site 28, that may include a large number of servers, may be assigned the task of handling incoming accesses to a given URL. As a result, a very large load of attempted accesses may be efficiently handled without server failure.

This surge site 28 may be a shared resource for hosting surge pages for multiple non-concurrent broadcast events. The surge site 28 may thereby achieve an economy of resources, conserving the capabilities of a plurality of servers.

Figure 2:
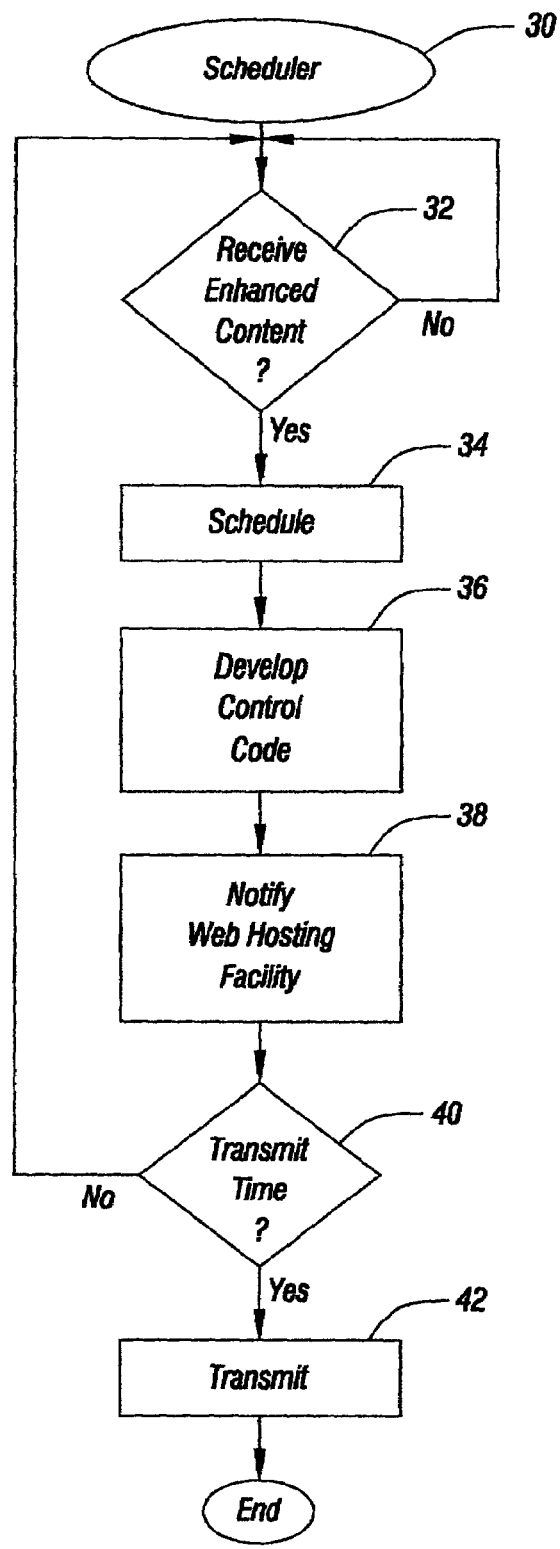
FIG. 2 is a flow chart for software in accordance with one embodiment of the invention which may be stored on the scheduler shown in FIG. 1.

Referring to FIG. 2, the software 30 may be stored in the appropriate memory within the scheduler 16 in one embodiment of the present invention. The scheduler 16 is itself an information handling system or processor-based system, such as a server, in accordance with one embodiment of the present invention. Thus, the software 30 may be stored in a memory associated with the server 16 for execution by a processor included within the server 16.

The scheduler software 30 initially checks to determine whether ancillary data has been received as indicated in diamond 32. This data may be received from various content providers for distribution over a transport 18. The transport 18 may be any of a variety of conventional transports for providing television content including airwave broadcasts systems, satellite transmission systems or cable distribution systems.

Once the information has been received, the software 30 schedules the transmission of that information as indicated in block 34. Further, the control code 12 is developed as indicated in block 36. For example, the control code 12 may provide information about the URL that may be broadcast as well as its broadcast times, geographical area and other pertinent information.

In addition, the scheduler software 30 may immediately notify the web hosting facility 26 affected by a given URL broadcast, as indicated in block 38. Once the URLs that are going to be broadcast with television programming are identified, a lookup table may be utilized to identify the web hosting facility 26 associated with each broadcast URL. As a result, the web hosting facility 26 may be automatically notified, for example, over the Internet 22 using a back channel 20. Should be schedule be changed, a scheduler may send an updated notification of a new surge time.

A check at diamond 40 determines whether the transmission time for any content to be transmitted has arrived. If so, that content is transmitted as indicated in block 42. The transmitted content may include programming, ancillary data and the control codes.

Figure 3:
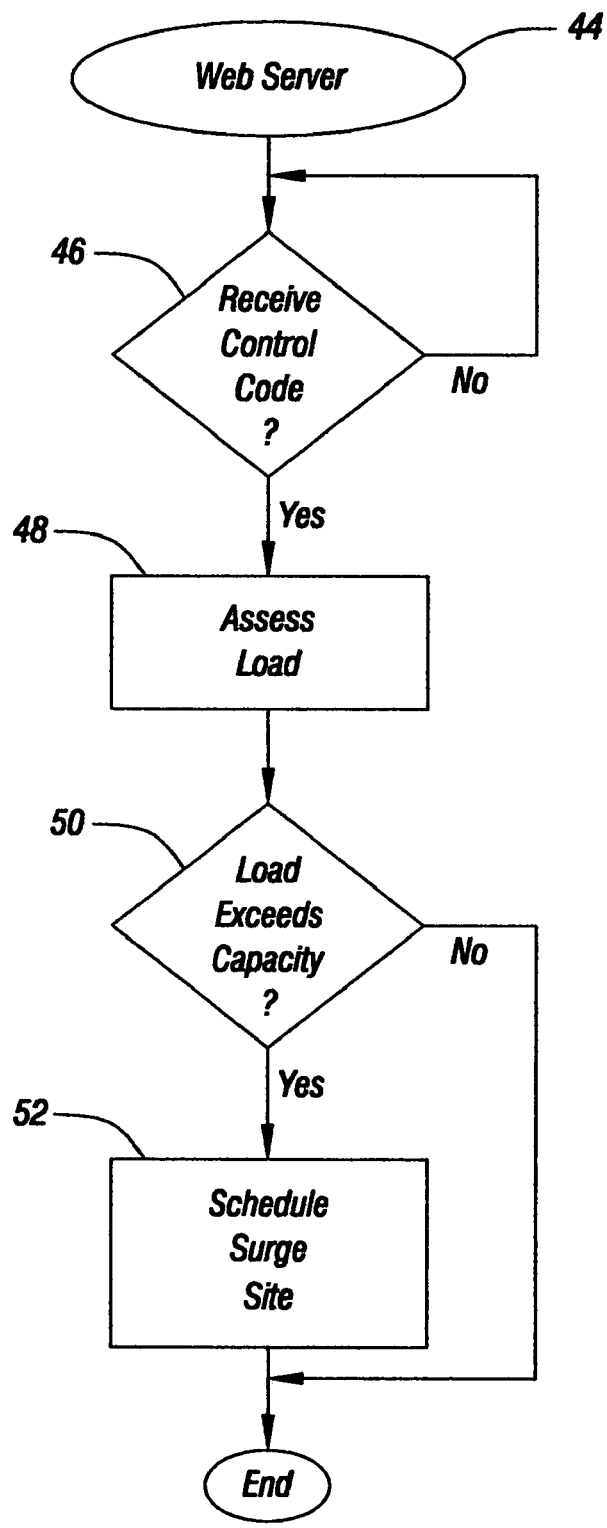
FIG. 3 is a flow chart for software in accordance with one embodiment of the present invention that may be stored at the web hosting facility shown in FIG. 1.

Turning next to FIG. 3, the software 44 may be stored in a memory in a processor-based system, such as a server at the facility 26, in one embodiment of the invention. Initially, a check at diamond 46 determines whether the control code 12 has been received. It may be received through a back channel 20 or over the transport 18 that also provides the programming information. The control code 12 may be parsed from the programming information. Once the control code is identified, it may provide sufficient information to determine what the nature of the broadcast will be and to enable the facility 26 to predict its load at given periods of time. Thus, the facility 26 assesses the load as indicated in block 48.

A check at diamond 50 determines whether the expected load exceeds the available capacity. If so, a surge site may be scheduled as indicated in block 52. Again, the surge site may be a very high capacity site that can handle a large number of accesses over a relatively short period. The surge site may be a shared resource for non-concurrent surge events.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   sending, to a web site hosting facility, scheduling information about when a uniform resource locator will be transmitted, sufficiently before video information containing said uniform resource locator is distributed to a receiver of said uniform resource locator and video information to enable the facility to prepare for an increased access load; and
   transmitting said video information in the form of television programming to a plurality of receivers and said web site hosting facility.

2. The method of claim 1 wherein sending scheduling information includes sending said scheduling information with said television programming and ancillary data.

3. The method of claim 1 wherein transmitting television programming includes transmitting said programming with ancillary data over a transport and sending said scheduling information over said transport.

4. The method of claim 3 further including sending said scheduling information at a different time than said television programming.

5. The method of claim 1 further including sending said scheduling information over a first transport and sending said television programming over a second transport.

6. The method of claim 5 wherein sending said scheduling information includes sending said scheduling information over the Internet and sending said television programming over a broadcast transport.

7. The method of claim 1 including transmitting television programming and ancillary data.

8. The method of claim 7 including automatically sending said scheduling information to said web site hosting facility.

9. The method of claim 8 including automatically sending said scheduling information in two independent ways to said web site hosting facility.

10. A computer-readable medium storing instructions that, when executed, enable a processor-based system to:
    send, to a web site hosting facility, scheduling information about when a uniform resource locator will be transmitted together with video information to a plurality of receivers, sufficiently before said video containing said uniform resource locator is distributed to said receivers to enable the web hosting facility to prepare for a potentially increased access load; and
    transmit television programming including said video information to a plurality of receivers, one receiver including the web site hosting facility.

11. The medium of claim 10 further storing instructions that cause a processor-based system to transmit said programming with ancillary data over a transport and send said scheduling information over said transport.

12. The medium of claim 11 further storing instructions that cause a processor-based system to send said scheduling information at a different time than said television programming.

13. The medium of claim 10 further storing instructions that cause a processor-based system to send said scheduling information over a first transport and send said television programming over a second transport.

14. The medium of claim 13 further storing instructions that cause a processor-based system to send said scheduling information over the Internet and send said television programming over a broadcast transport.

15. The medium of claim 10 further storing instructions that cause a processor-based system to transmit television programming with ancillary data.

16. The medium of claim 15 further storing instructions that cause a processor-based system to automatically send said scheduling information to said web site hosting facility.

17. The medium of claim 16 further storing instructions that cause a processor-based system to automatically send said scheduling information in two independent ways to said web site hosting facility.

18. A system comprising:
   a video distribution device;
   a transport coupled to said video distribution device to distribute video to a plurality of receivers; and
   storage coupled to said device, said storage storing instructions that enable said device to send scheduling information to a web site hosting facility sufficiently in advance of video containing a uniform resource locator being distributed to a plurality of receivers to enable the web hosting facility to prepare for a potentially increased access load in response to the distribution of said video, said web site hosting facility other than said plurality of receivers, and said instructions to enable said device to transport said video containing said uniform resource locator to said web site hosting facility and said receivers.

19. The system of claim 18 wherein said distribution device is coupled to said web hosting facility through the Internet and instructions stored in said storage cause said device to automatically notify said web site hosting facility over the Internet before video which includes a uniform resource locator is distributed to said receivers.

20. The system of claim 18 including two transports coupled between said video distribution device and said web site hosting facility.

21. The system of claim 20 wherein instructions stored on said storage cause said video distribution device to automatically notify the web hosting facility over two different transports when a universal resource locator will be transmitted with said video distributed to said receivers.

22. The system of claim 18 wherein said video distribution device schedules video programming for distribution to said plurality of receivers.

23. The system of claim 22 wherein said video distribution device transmits programming with ancillary data.

* * * * *